United States Patent Office 2,741,634
Patented Apr. 10, 1956

2,741,634

MANUFACTURE OF FLUOROCHLOROACETYL HALIDE

Charles B. Miller and Cyril Woolf, Morristown, N. J., assignors to Allied Chemical & Dye Corporation, New York, N. Y., a corporation of New York No Drawing. Application February 9, 1955,
Serial No. 487,219

11 Claims. (Cl. 260—544)

This invention relates to processes for making difluorochloroacetyl chloride, $CClF_2.COCl$, useful e. g. as an intermediate for manufacture of $CClF_2.COOH$, as an esterifying agent, and as a reactant in Friedel-Crafts reactions to introduce the $CClF_2.CO$ group.

More particularly the invention is directed to manufacture of difluorochloroacetyl chloride from sym-tetrafluorodichloroacetone as starting material. Objects of the invention include provision of vapor-phase methods for making difluorochloroacetyl chloride as principal sought-for product in conjunction with $CF_2=CF_2$ or $CCl_2F_2$ as alternative fluorinated by-products.

According to the invention, it has been discovered that when sym-tetrafluorochloroacetone is subjected to heat at hereindisclosed temperatures, the sought-for product, $CClF_2.COCl$, may be obtained in good yields. Further, we find that this principal product formation is effected whether the starting material is subjected to such heating in the absence or presence of certain chlorinating materials. Moreover, it has been ascertained that when subjecting the starting material to heat in the absence of chlorinating material, one valuable fluorinated by-product, $CF_2=CF_2$ is formed, and that when the starting material is subjected to heat in the presence of certain chlorinating material, another valuable fluorinated by-product, $CCl_2F_2$, is formed. The foregoing economic advantages, arising from the formation of the principal product and formation of alternative fluorinated by-products to meet changeable market demands, are attributable to the present discovery of the particular properties and characteristics of the starting material involved, namely, sym-tetrafluorodichloroacetone.

Symmetrical tetrafluorodichloroacetone at ordinary conditions is a substantially colorless liquid of the composition $CClF_2.CO.CClF_2$ and having a boiling point of about 44° C. This compound may be made for example by effecting reaction between anhydrous HF and hexachloroacetone at moderately elevated temperature while in the presence of antimony pentahalide and while maintaining the reaction mass substantially in the liquid phase, and thereafter recovering the $CClF_2.CO.CClF_2$ from the reaction products by suitable procedure such as distillation.

The following exemplifies manufacture of $CClF_2.CO.CClF_2$ 1060 parts (weight) of hexachloroacetone and 571 parts of $SbCl_5$ were charged to a steel reactor connected with a fractionating column and reflux condenser cooled with ice water. The total of organic starting material and antimony pentahalide charged contained about 32 mol percent of the latter. HF was fed to the reactor initially maintained at 90° C. for 17 hours when the reaction temperature fell to 72° C. due to reflux of lower boiling perchlorofluoroacetone. Exit gas was partially condensed in a steel trap immersed in acetone-Dry Ice mixture and the residual HCl, 15.2 mols, was taken up in water. Reaction products were then distilled from the reactor until a pot temperature of 140° C. was reached. Product condensed in the acetone-Dry Ice trap was fractionally distilled to remove unreacted HF, and the still pot residue was combined with the main organic reaction products from the trap and the combined materials were then subjected to fractional distillation. 285 parts of $CClF_2.CO.CClF_2$ were recovered. Manufacture of $CClF_2.CO.CClF_2$ is discussed in greater detail in our copending application Serial No. 494,237, filed March 14, 1955 (a continuation-in-part of our copending application Serial No. 411,028, filed February 17, 1954, now abandoned) wherein this compound and processes for making the same are claimed.

The process of the present invention is an easily controlled, vapor phase operation. In general practice, the starting material is initially vaporized and passed into and thru a reactor provided with external heating equipment preferably including automatic means for maintaining given temperatures in the reaction zone. Suitable materials for reactor construction include graphite, nickel, inconel and monel metals, and silver. Vapors and gases exiting the reactor are cooled and condensed, e. g. by Dry Ice or liquid nitrogen traps or both as may be necessary, and unreacted starting material, principal product and by-products may be separated and recovered from trap condensates by fractional distillation expedients customary in this art.

As indicated, the invention comprises the discovery that when $CClF_2.CO.CClF_2$ is subjected to heat at certain temperatures, the principal product, $CClF_2.COCl$, is formed. For descriptive purposes, practice of the invention may be considered as involving chiefly two phases or modifications. The particular phase to be employed depends upon which ever of two fluorinated by-products is desired, and the latter in turn depends upon market or other economic considerations.

From procedural standpoint, the invention generically involves heating the starting material to temperatures within a specified range. Provided temperatures are as herein described, the principal product, $CClF_2.COCl$, is formed. More particularly and specifically, the present improvements involve heating the starting material at the temperatures disclosed in the absence of reactive chlorinating material, in which instance $CClF_2.COCl$ is formed and the fluorinated by-product is $CF_2=CF_2$, or subjecting the starting material to heating in the presence of particular chlorinating material in which case $CClF_2.COCl$ is formed and the fluorinated by-product obtained is $CCl_2F_2$. For convenience of disclosure and illustration, the first modification is designated herein as a pyrolytic operation, while the second modification may be considered at least to a significant extent as a chlorinating reaction, i. e. involving chemical reaction between starting material and a chlorinating material. Unless otherwise modified, in this specification and claims, "pyrolysis" is intended to designate an operation in which reaction is effected by the agency of heat in the absence of chlorine or a chlorine donating material chemically reactive with the starting material at temperatures of operation. However, "pyrolysis" is not intended to exclude the presence in the reaction zone of a suitable catalyst if use of the same is desired. For example, nickel carbonyl is a homogeneous catalyst which promotes reaction in all phases of the invention processes. Neither is "pyrolysis'" intended to exclude the presence in the reaction zone of diluents which might desirably be employed for temperature control purposes, or the presence of other chlorine containing compounds which are not reactive with the starting material at the temperatures of operation. Further, the expression "chlorinating material" is employed herein in the sense of a chlorine or chlorine containing compound which is chemically reactive with the starting material at the temperatures of operation.

For pyrolytic manufacture of CClF$_2$.COCl, the reaction involved appears to be—

$$2CClF_2.CO.CClF_2 \rightarrow 2CClF_2.COCl + CF_2=CF_2$$

and starting material-chlorinating material manufacture of CClF$_2$.COCl appears to involve e. g.

$$CClF_2.CO.CClF_2 + Cl_2 \rightarrow CClF_2.COCl + CCl_2F_2$$

or $$CClF_2.CO.CClF_2 + CCl_4 \rightarrow$$
$$CClF_2.COCl + CCl_2F_2 + C_2Cl_4 + C_2Cl_6$$

Temperature employed in carrying out the invention reactions may lie in the range of 500–750° C., depending upon such factors as reaction completeness desired and reaction time, i. e. time during which each incremental portion of starting material and chlorinating material if present is exposed to reaction conditions in the reactor. With reasonable reaction time, appreciable quantities of principal product and by-product form at the lower temperature. At temperatures above about 750° C. no significant advantages result, and deleterious decomposition, particularly of CClF$_2$.COCl and CF$_2$=CF$_2$, is initiated. Best practice is effected in a preferred temperature range of 525–700° C. When operation is by straight pyrolysis, reaction appears to be slightly endothermic. However, the chlorinating reaction is fairly strongly exothermic and appreciable quantities of heat are developed. Hence, to promote smoothness of temperature control, reaction may be effected in the presence of a suitable diluent such as nitrogen or say CCl$_2$F$_2$. Reactions are carried out preferably at atmospheric pressure, although sub- or superatmospheric pressures may be employed.

It has been found that reaction time has an important bearing on yield, and that best yields are obtained preferably by regulating reaction time in such a way as to effect moderately low conversion of ketone per pass thru the reactor. In this specification, conversion is intended to indicate the percent by weight of starting material which reacted, and yield indicates percent by weight of reacted starting material which is changed to sought-for product or by-product. While reaction times may be chosen with no particular regard for limitation of ketone conversion per pass thru the reactor, in the better embodiments of the invention we prefer to subject the $$CClF_2.CO.CClF_2$$

starting material to heating at the temperatures indicated for a time sufficient to effect substantial but not more than about 50% by weight conversion of the ketone starting material to reaction products. While actual reaction time periods may vary over a considerable range, it is preferred to pass the starting material together with the chlorinating material reactant if present thru the reactor at a sufficiently rapid rate of flow such that conversion of ketone during one pass thru the reactor is not more than about 50% by weight. In view of factors such as presence or absence of diluents and/or catalysts in the reaction zone, design of apparatus, size of operation, and other permissible variables, it is not possible to specify reaction time periods applicable in all circumstances. Because of this situation, for an operation under any given set of conditions, optimum reaction time for such a particular operation may and should be determined by a trial run or two. While good low ketone conversion, high yields of product and by-product, and maintenance of conversion at about or below the indicated 50% value may be had with reaction time as high as about 15 seconds, preferred reaction time lies in the range of about 0.5 to 3.0 seconds.

The foregoing operating factors including temperature and time of reaction apply to practice of all aspects of the invention.

In the practice of pyrolysis modification of the invention, the reactor exit products, comprising mostly $$CClF_2.COCl$$

(B. P. 24.8° C.) and CF$_2$=CF$_2$ (B. P. minus 78.2° C.), together with possible small quantities of CCl$_2$F$_2$, CO, and CF$_2$=CF$_2$ polymers may be passed first thru a Dry Ice trap, and residual uncondensed gases and vapors leaving the Dry Ice trap pass then into and thru a liquid nitrogen trap, any small amounts of CO not being condensed. The trap condensates may be combined and unconverted starting material, CClF$_2$.COCl and CF$_2$=CF$_2$ separated and recovered by fractional distillation.

With regard to that phase of the invention involving use in the reactor of a chlorinating material, the latter may be elemental chlorine or a chlorinated material such as CCl$_4$ which acts as a chlorine donor under the conditions of reaction. Minimum quantity of chlorinating material may be any amount which is sufficient to react with substantial amount of the CClF$_2$.CO.CClF$_2$ starting material. While say a 10–40% excess of chlorine or CCl$_4$ may be employed without too great disadvantage, we find that temperature control and yields are best where the amount of chlorine or CCl$_4$ employed is not substantially in excess of one mol per mol CClF$_2$.CO.CClF$_2$.

In the case of the use of elemental chlorine, the preferred chlorinating material, in conjunction with the ketone starting material, products exiting the reactor are CClF$_2$.COCl and the fluorinated by-product, CCl$_2$F$_2$ (B. P. minus 30° C.). Such products may be condensed and collected in a Dry-Ice cooled trap, and unreacted starting material, CClF$_2$.COCl and CCl$_2$F$_2$ may be separated and recovered from the trap condensate by fractional distillation. When CCl$_4$ is employed as a chlorine donor, in addition to CClF$_2$.COCl and CCl$_2$F$_2$, the products exiting the reaction zone may contain appreciable quantities of C$_2$Cl$_4$ and C$_2$Cl$_6$. Separation and recovery of CClF$_2$.COCl and CCl$_2$F$_2$ from other materials may be effected by fractional distillation.

Following examples illustrate practice of the invention:

*Example 1.*—CClF$_2$.CO.CClF$_2$ was vaporized and charged into a 1″ I. D. tubular nickel reactor providing a reaction zone of 30 inch length. The reactor was externally heated by an electric furnace automatically controlled by a potentiometer system. Maximum internal central temperature in the reaction zone was held at about 540° C., and during the run pyrolysis temperature throughout the reaction zone was not more than a few degrees C. below this value. CClF$_2$.CO.CClF$_2$ vapor was charged into the pyrolyzer at a rate of 0.74 mol/hr. Pyrolysis time for each incremental portion of starting material was about 10 seconds. Products of pyrolysis were passed first thru a Dry-Ice trap, and residual uncondensed gases leaving the Dry-Ice trap were passed thru a liquid nitrogen trap. The condensates in the traps were combined and unconverted starting material and reaction products were separated by fractional distillation. At the stated feed rate of CClF$_2$.CO.CClF$_2$, conversion of the ketone by pyrolysis was 22% by weight. CClF$_2$.COCl was formed at a rate of 0.12 mol/hr. (77% yield), and CF$_2$=CF$_2$ was produced at a rate of 0.04 mol/hr. (47% yield).

*Example 2.*—CClF$_2$.CO.CClF$_2$ was vaporized and charged into a 0.5″ I. D. silver tubular reactor providing a reaction zone 19 inches long. By an automatically controlled electric furnace, the maximum internal central temperature in the reaction zone was maintained during the run at about 675° C., and temperature throughout the reaction zone was not more than a few degrees C. lower. Sym-tetrafluorodichloroacetone vapor was passed into the reactor at a rate of 2.00 mols/hr. Pyrolysis time was about 0.6 second. Conversion of ketone by pyrolysis was 37% by weight. Unconverted starting material and pyrolysis products were recovered by cooling and distillation as in Example 1. Production of CClF$_2$.COCl was 0.53 mol/hr. (72% yield), and formation of CF$_2$=CF$_2$ was 0.21 mol/hr. (57% yield).

*Example 3.*—CClF$_2$CO.CClF$_2$ was vaporized and charged into the Example 2 reactor. The latter was maintained at maximum central temperature of about 550° C. and reaction temperature throughout the reactor was not more than a few degrees C. below this value. Feed of symmetrical-tetrafluorodichloroacetone and chlorine to the reactor were at rates of 1.83 mols/hr. and 0.47 mol/hr. respectively. Products exiting the reaction zone were collected in a Dry-Ice cooled trap. Reaction time for incremental portions of reactants was about 0.5 second. Under the reaction conditions stated, conversion of the ketone was 36% by weight, and 65% of the chlorine reacted. Chlorine and $CCl_2F_2$ were separated from $CClF_2.COCl$ and unreacted $CClF_2.CO.CClF_2$ by distillation, and the $CCl_2F_2$ and chlorine were separated from each other by passing the $CCl_2F_2$-chlorine mixture thru an aqueous NaOH solution, the $CCl_2F_2$ exiting the NaOH solution being dried by passing over $CaCl_2$. Still bottom $CClF_2.COCl$ and unreacted $CClF_2.CO.CClF_2$ were separated from each other by further distillation. $CClF_2.COCl$ was produced at a rate of 0.55 mol/hr. (85% yield), and $CCl_2F_2$ at a rate of about 0.52 mol/hr. (80% yield).

*Example 4.*—The reactor of Example 3 was employed and during the run maximum central temperature of the reaction zone was about 625° C., and reaction temperature throughout the reaction zone was not more than a few degrees lower. Products exiting the reaction zone were collected in a Dry-Ice cooled trap. $CClF_2.CO.CClF_2$ vapor was fed into the reactor at a rate of 1.03 mols/hr., and feed of $CCl_4$ vapor was at a rate of 1.08 mols/hr. Reaction time for incremental portions of reactants was about 0.6 second. Under the reaction conditions stated, 36% by weight of the ketone and 34% of the $CCl_4$ reacted. $CClF_2.COCl$, $CCl_2F_2$ and unreacted

were separated from high boiling $C_2Cl_4$ and $C_2Cl_6$ by distillation, and $CClF_2.COCl$ and $CCl_2F_2$ were recovered as in Example 3. $CClF_2.COCl$ was formed at a rate of 0.31 mol/hr. (85% yield), and $CCl_2F_2$ was produced at a rate of 0.16 mol/hr. (44% yield).

We claim:
1. The process for making $CClF_2.COCl$ which comprises subjecting $CClF_2.CO.CClF_2$ to heating at temperature substantially in the range of 500–750° C.
2. The process which comprises subjecting

to heating at temperature substantially in the range of 500–750° C., and recovering $CClF_2.COCl$ from the resulting reaction products.

3. The process of claim 1 in which the temperature is substantially in the range of 525–700° C.
4. The process for making $CClF_2.COCl$ which comprises subjecting $CClF_2.CO.CClF_2$ to heating at temperature substantially in the range of 500–750° C. for a time sufficient to effect substantial but not more than about 50% by weight conversion of said $CClF_2.CO.CClF_2$ to reaction products.
5. The process of claim 4 in which temperature is substantially in the range of 525–700° C.
6. The process for making $CClF_2.COCl$ and $CF_2=CF_2$ which comprises pyrolyzing $CClF_2.CO.CClF_2$ at temperature substantially in the range of 500–750° C., and recovering $CClF_2.COCl$ and $CF_2=CF_2$ from the resulting reaction products.
7. The process of claim 6 in which temperature is substantially in the range of 525–700° C. and pyrolysis time is sufficient to effect substantial but not more than about 50% by weight conversion of said $CClF_2.CO.CClF_2$ to reaction products.
8. The process for making $CClF_2.COCl$ and $CCl_2F_2$ which comprises subjecting $CClF_2.CO.CClF_2$ to heating at temperature substantially in the range of 500–750° C. while in the presence of chlorinating material of a group consisting of chlorine and $CCl_4$, and recovering $CClF_2.COCl$ and $CCl_2F_2$ from the resulting reaction products.
9. The process of claim 8 in which the chlorinating material is present in amount sufficient to react with a substantial amount of said $CClF_2.CO.CClF_2$ but not substantially in excess of one mol per mol of said $CClF_2.CO.CClF_2$, and temperature is substantially in the range of 525–700° C.
10. The process of claim 8 in which reaction time is sufficient to effect substantial but not more than about 50% by weight conversion of said $CClF_2.CO.CClF_2$.
11. A process for making $CClF_2.COCl$ and $CCl_2F_2$ which comprises subjecting $CClF_2.CO.CClF_2$ to heating at temperature substantially in the range of 525–700° C. while in the presence of chlorine in amount sufficient to react with a substantial amount of said $CClF_2.CO.CClF_2$ but not substantially in excess of one mol per mol of $CClF_2.CO.CClF_2$, regulating the reaction time to effect substantial but not more than about 50% by weight conversion of said $CClF_2.CO.CClF_2$, and recovering $CClF_2.COCl$ and $CCl_2F_2$ from the resulting reaction products.

No references cited.